United States Patent
Hug et al.

(10) Patent No.: US 9,962,854 B2
(45) Date of Patent: May 8, 2018

(54) METHOD FOR PRODUCING AT LEAST ONE CUTTING UNIT SEGMENT OF A CUTTING UNIT

(71) Applicant: Robert Bosch GmbH, Stuttgart (DE)

(72) Inventors: Arnold Hug, Gamsen (CH); Urs Karlen, Stalden (CH); Milan Bozic, Solothurn (CH); Joe Lauber, Zermatt (CH); Ivo Gruber, St. Niklaus (CH)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 14/381,614

(22) PCT Filed: Jan. 3, 2013

(86) PCT No.: PCT/EP2013/050044
§ 371 (c)(1),
(2) Date: Aug. 28, 2014

(87) PCT Pub. No.: WO2013/127542
PCT Pub. Date: Sep. 6, 2013

(65) Prior Publication Data
US 2015/0013173 A1    Jan. 15, 2015

(30) Foreign Application Priority Data

Mar. 2, 2012  (DE) .................. 10 2012 004 052
Oct. 30, 2012  (DE) .................. 10 2012 219 855

(51) Int. Cl.
*B27B 33/14*    (2006.01)
*B23D 65/02*    (2006.01)
*B27B 17/02*    (2006.01)

(52) U.S. Cl.
CPC ............ *B27B 33/142* (2013.01); *B23D 65/02* (2013.01); *B27B 17/02* (2013.01); *Y10T 83/909* (2015.04); *Y10T 83/9319* (2015.04)

(58) Field of Classification Search
CPC ... Y10T 83/909; Y10T 83/913; Y10T 83/917; Y10T 83/921; Y10T 83/925;
(Continued)

(56) References Cited

U.S. PATENT DOCUMENTS

| 3,144,059 A | 8/1964 | Oehrli |
| 3,308,859 A | 3/1967 | Ehlen |

(Continued)

FOREIGN PATENT DOCUMENTS

| DE | 37 34 148 A1 | 4/1989 |
| DE | 10 2010 011 837 A1 | 9/2011 |

(Continued)

OTHER PUBLICATIONS

DE102010011837 English translation; Sep. 22, 2011, Arndt Guido Dipling et al.*
(Continued)

*Primary Examiner* — Laura M Lee
(74) *Attorney, Agent, or Firm* — Maginot, Moore & Beck LLP (57) ABSTRACT

A method for producing at least one cutting strand segment of a cutting strand comprises punching at least one cutting strand segment out of a band material. The at least one cutting strand segment includes at least one cutting element and at least one cutter carrier element having at least one connecting element.

9 Claims, 6 Drawing Sheets

(58) Field of Classification Search
CPC ... Y10T 29/4946; B27B 33/142; B23D 65/00; B23D 65/02; B23D 65/04
USPC .......... 83/830–834, 788–820; 76/25.1–80.5; 30/381–387; 72/379.2
See application file for complete search history.

(56) References Cited

U.S. PATENT DOCUMENTS

| | | | |
|---|---|---|---|
| 3,380,496 A | | 4/1968 | Hill |
| 3,449,146 A | * | 6/1969 | Dawson .................. C23C 24/00 118/620 |
| RE26,676 E | * | 9/1969 | Anderson et al. ... B23D 61/125 76/112 |
| 4,382,334 A | * | 5/1983 | Reynolds ............. B23D 63/168 144/73 |
| 4,606,253 A | * | 8/1986 | Weigel .................. B23D 65/02 83/830 |
| 6,871,573 B2 | * | 3/2005 | Mang .................... B27B 33/141 83/830 |
| 8,104,378 B2 | * | 1/2012 | Ahorner ................. B23D 65/00 76/112 |
| 2004/0035253 A1 | * | 2/2004 | Nicolson ................ B23D 61/14 76/112 |
| 2008/0121084 A1 | * | 5/2008 | Vogel ..................... B23D 61/12 83/835 |
| 2010/0224047 A1 | * | 9/2010 | Prodinger .............. B27B 33/14 83/830 |
| 2014/0150620 A1 | * | 6/2014 | Elliston ................ B23D 61/127 83/661 |
| 2015/0122102 A1 | * | 5/2015 | Engelfried ............ B27B 33/142 83/788 |

FOREIGN PATENT DOCUMENTS

| | | |
|---|---|---|
| DE | 10 2012 206 769 A1 | 10/2013 |
| WO | 2012/143419 A1 | 10/2012 |

OTHER PUBLICATIONS

International Search Report corresponding to PCT Application No. PCT/EP2013/050044, dated May 7, 2013 (German and English language document) (7 pages).

* cited by examiner

METHOD FOR PRODUCING AT LEAST ONE CUTTING UNIT SEGMENT OF A CUTTING UNIT

This application is a 35 U.S.C. § 371 National Stage Application of PCT/EP2013/050044, filed on Jan. 3, 2013, which claims the benefit of priority to Serial No. DE 10 2012 004 052.0 filed on Mar. 2, 2012 in Germany and Serial No. DE 10 2012 219 855.5, filed on Oct. 30, 2012 in Germany, the disclosures of which are incorporated herein by reference in their entirety.

BACKGROUND

Methods for producing a cutting strand segment of a cutting strand are already known. The cutting strand segment comprises in this case a cutter carrier element and a cutting element which are connected together in accordance with a production method.

SUMMARY

Proposed is a method for producing at least one cutting strand segment of a cutting strand which comprises at least one cutting element and at least one cutter carrier element that has at least one connecting element, wherein, in a first step, the cutting strand segment is punched out of a band material. Thus, the cutting strand segment is preferably fed in a first step at least to a punching device by means of which the cutting strand segment is punched out of the band material. In this case, the punching device has a configuration already known to a person skilled in the art. A "cutting strand segment" should be understood here as meaning in particular a segment of a cutting strand, said segment being intended to be connected to further segments of the cutting strand in order to form the cutting strand. The cutting strand segment has in particular a maximum weight which is less than 1 g, preferably less than 0.5 g and particularly preferably less than 0.2 g. In particular, the cutting strand segment has a maximum volume which is less than 20 $mm^3$. Preferably, the cutting strand segment has a maximum volume which is less than 10 $mm^3$ and particularly preferably less than 5 $mm^3$. Preferably, the cutting strand segment is in the form of a chain link which is connected to further cutting strand segments in the form of chain links in order to form the cutting strand, which is preferably in the form of a cutting chain. A "cutting strand" should be understood here as meaning in particular a unit composed of cutting strand segments, said unit being intended to locally undo atomic cohesion of a workpiece to be machined, in particular by means of a mechanical parting-off process and/or by means of mechanical removal of material particles of the workpiece. Preferably, the cutting strand is intended to separate the workpiece into at least two physically separate parts and/or to at least partially part off and/or remove material particles of the workpiece starting from a surface of the workpiece. The cutting strand is particularly preferably in the form of a cutting chain. In this case, the cutting strand segments can be connected together detachably, for example by means of a chain joint etc., and/or non-detachably. However, it is also conceivable for the cutting strand to be in the form of a cutting band and/or cutting line. When the cutting strand is in the form of a cutting band and/or cutting line, the cutting strand segments are fixed directly to the cutting band and/or to the cutting line. The cutting strand segments can in this case be arranged on the cutting band and/or on the cutting line in a manner spaced apart from one another and/or in direct contact with one another.

A "cutter carrier element" should be understood here as meaning in particular an element to which at least one cutting element for parting off and/or for removing material particles of a workpiece to be machined is fixed. Preferably, the cutter carrier element is connected cohesively to the cutting element. The cutting element and/or the cutter carrier element have/has in particular a maximum dimension which is less than 4 mm, when viewed in a direction extending at least substantially perpendicularly to a cutting plane of the cutting element or of the cutting strand. Preferably, the cutting element and/or the cutter carrier element, or the further cutter carrier element, have/has a maximum dimension which is less than 3 mm and particularly preferably less than 2.5 mm, when viewed in the direction extending at least substantially perpendicularly to the cutting plane of the cutting element or of the cutting strand. Particularly preferably, the cutting element is formed integrally with the cutter carrier element. The expression "integrally" should be understood in particular as meaning formed in one piece, for example by being produced from a casting and/or by being produced in a single-component or multi-component injection-molding process, and advantageously from a single blank, for example a punching blank. In this case, the cutting element can be in the form of a half chisel tooth, of a full chisel tooth, of a "scratcher" tooth etc. However, it is also conceivable for the cutting element to have some other tooth shape that appears appropriate to a person skilled in the art. The expression "connecting element" should be understood here as meaning in particular an element which is intended to connect at least two components together in a form-fitting and/or force-fitting manner, in particular connect them together in a movable manner in order to transmit a drive force and/or a drive torque. In this connection, the term "intended" should be understood as meaning in particular specially designed and/or specially equipped. By means of the configuration according to the disclosure of the method, a cutting strand segment can advantageously be produced cost-effectively. Furthermore, by means of the method, a large variety with regard to the materials to be processed to produce the cutting strand segment can be achieved.

In a preferred configuration of the method, it is proposed that bimetal be used as the band material. Preferably, the bimetal is in the form of a flexible, high-strength bimetal combination composed of high carbon steel (HCS) and high speed steel (HSS). However, it is also conceivable for the band material to be formed only from one of the abovementioned materials of the bimetal combination. A durable cutting strand segment which is suitable for machining hard materials can advantageously be achieved.

In an alternative configuration of the method, it is proposed that a hard metal be used as the band material. However, it is also conceivable for the band material to be formed from some other material that appears appropriate to a person skilled in the art. A cutting strand segment which is suitable for machining abrasive materials, for example glass-fiber reinforced plastic, cellular concrete etc., can advantageously be produced.

Advantageously, in a further step, the cutting strand segment is subjected to an embossing operation at least in a subregion of the cutting element. By means of the embossing operation according to the disclosure, a set of the cutting element relative to a cutting plane of the cutting strand can be achieved. In addition, it is also conceivable for, as an alternative or in addition to the embossing process, a hard-metal cutting edge to be applied to the cutting element of the cutting strand segment or for a strip of highly wear-resistant material to be soldered on as cutting edge, which is sharpened by means of a grinding process. Particularly preferably, a hard-metal cutting edge in the form of a strip, or a strip composed of some other highly wear-resistant material that appears appropriate to a person skilled in the art, is attached to the cutting element as a cutting edge reinforcing element by means of a welding process following the punching operation. In this case, any welding process that appears appropriate to a person skilled in the art is usable, for example the use of a laser welding process, an inert gas welding process, a forge welding process, a gas fusion welding process, an arc welding process, etc. In particular, a weld seam via which the cutting edge reinforcing element is connected to the cutting element has a maximum spacing relative to a cutting edge of the cutting element, or relative to a tooth tip of the cutting element, of less than 1 mm, preferably less than 0.7 mm and particularly preferably less than 0.4 mm. In this case, the maximum spacing is measured preferably in a direction, extending at least substantially perpendicularly to a cutting direction of the cutting element or of the cutting strand, between a center axis of the weld seam and the cutting edge or the tooth tip. Preferably, a minimum spacing of the weld seam from the cutting edge or from the tooth tip is in this case not less than 0.3 mm. By means of the spacing between the weld seam and the cutting edge or the tooth tip, it is advantageously possible to ensure that, in particular in the case of small dimensions of the cutting strand segment, a sufficient quantity of material of the hard-metal cutting edge or of the highly wear-resistant material can be attached to the cutting element without a diffusion zone of the weld seam being reached after a few cutting operations as a result of wear to the hard-metal cutting edge or to the highly wear-resistant material.

In particular, the weld seam has, in particular when viewed in a direction toward the cutter carrier element starting from the cutting edge or the tooth tip, a maximum spacing of less than 0.8 mm, preferably less than 0.4 mm and particular preferably less than 0.3 mm, from an embossed contour, in particular from a closest embossed contour. In this case, the maximum spacing between the weld seam and the embossed contour, in particular between a side of the weld seam that is closest to the embossed contour and a side of the embossed contour that is closest to the weld seam, is measured. Preferably, a minimum spacing of the weld seam from an embossed contour, in particular from a closest embossed contour, is in this case not less than 0.2 mm. Preferably, the embossed contour, when viewed in the direction toward the cutter carrier element starting from the cutting edge or the tooth tip, is arranged downstream of the cutting edge or the tooth tip. Preferably, the direction toward the cutter carrier element starting from the cutting edge or the tooth tip extends at least substantially perpendicularly to the cutting direction of the cutting element or of the cutting strand. As a result of the arrangement according to the disclosure of the weld seam relative to a closest embossed contour, a deformation of the weld seam and/or a deformation of a hard region of the cutting element about the weld seam during an embossing operation can be avoided or kept small. Furthermore, the weld seam, when viewed in a direction that extends at least substantially parallel to a cutting plane of the cutting element or of the cutting strand and at least substantially perpendicularly to the cutting direction of the cutting element or of the cutting strand, has a maximum extent which is in particular less than 800 µm, preferably less than 600 µm and particularly preferably less than 460 µm. As a result, a high connecting strength of the weld seam at cutting forces that occur can advantageously be achieved with a small dimension of the weld seam.

Furthermore, it is proposed that, in a further step, the cutting strand segment is fed to a finishing device. A "finishing device" should be understood here as meaning in particular a device which is intended to change at least one property of an element or of a subregion of the element, in particular by means of coating, by means of hardening etc. Preferably, the finishing device comprises an immersion bath unit or an application unit. However, it is also conceivable for the finishing device alternatively or additionally to comprise a hardening unit. In this case, the hardening unit can be in the form of an aging unit or a hardening furnace etc. Preferably, finishing by means of an immersion bath or by means of application can be achieved by means of the finishing device. In this way, a long service life of the cutting strand segment can advantageously be achieved.

Preferably, in a further step, in the finishing device a coating is applied to the cutting strand segment at least in a subregion of the cutting strand segment. The coating is formed preferably by a solder. Preferably, the solder is formed by a copper or nickel solder. However, it is also conceivable for the solder to be formed by any other material that appears appropriate to a person skilled in the art. In this case, the coating is applied in particular by means of an immersion bath or by means of application onto the cutting strand segment. The subregion of the cutting strand segment is formed preferably by the cutting element of the cutting strand segment. Advantageously, a property of the subregion of the cutting strand segment can be adapted to various use requirements.

In addition, it is proposed that, in a further step, in the finishing device, that subregion of the cutting strand segment that is provided with a coating is furnished with particles. Preferably, the particles are in the form of a hard-metal, diamond and/or ceramic material. However, it is also conceivable for the particles to be formed from some other material that appears appropriate to a person skilled in the art. Advantageously, a hard and resistant subregion of the cutting strand segment can be achieved. In particular, when the subregion is configured as a cutting element, a hard, non-defined cutting edge of the cutting element can advantageously be realized by means of furnishing with particles.

Furthermore, the disclosure proceeds from a power-tool parting device having at least one guide unit and having at least one cutting strand which has at least one cutting strand segment produced by means of the method according to the disclosure. The guide unit is provided preferably for guiding the cutting strand. A "guide unit" should be understood here as meaning in particular a unit which is intended to exert on the cutting strand a constraining force at least in a direction perpendicular to a cutting direction of the cutting strand, in order to specify a movement capability of the cutting strand in the cutting direction. Preferably, the guide unit has at least one guide element, in particular a guide groove, through which the cutting strand is guided. Preferably, the cutting strand, as seen in a cutting plane, is guided through the guide unit around a full circumference of the guide unit by means of the guide element, in particular the guide groove.

The expression "cutting plane" is intended here in particular to define a plane in which the cutting strand is moved, in at least one operating state, around a circumference of the guide unit in at least two cutting directions, directed in opposite directions to one another, relative to the guide unit. Preferably, when a workpiece is machined, the cutting plane is oriented at least substantially transversely to a workpiece surface to be machined. The expression "at least substantially transversely" should be understood here as meaning in particular an orientation of a plane and/or a direction relative to a further plane and/or a further direction which preferably deviates from a parallel orientation of the plane and/or the direction relative to the further plane and/or the further direction. However, it is also conceivable for the cutting plane to be oriented, when a workpiece is machined, at least substantially parallel to a workpiece surface to be machined, in particular when the cutting strand is in the form of a grinding means etc. The expression "at least substantially parallel" should be understood here as meaning in particular an orientation of a direction relative to a reference direction, in particular in a plane, wherein the direction has a deviation in particular of less than 8°, advantageously less than 5° and particularly advantageously less than 2° with respect to the reference direction. A "cutting direction" should be understood here as meaning in particular a direction in which the cutting strand is moved in order to create a cutting gap and/or to part off and/or to remove material particles from a workpiece to be machined in at least one operating state as a result of a drive force and/or a drive torque, in particular in the guide unit. Preferably, in one operating state, the cutting strand is moved in the cutting direction relative to the guide unit.

The expression "closed system" is intended to define here in particular a system which comprises at least two components which retain functionality by means of interaction in a state in which the system is dismounted from a system superordinate to the system, for example a power tool, and/or which are connected captively together in the dismounted state. Preferably, the at least two components of the closed system are connected together at least substantially in a non-detachable manner for an operator. The expression "at least substantially in a non-detachable manner" should be understood here as meaning in particular a connection of at least two components which can be parted from one another only with the aid of parting tools, for example a saw, in particular a mechanical saw etc., and/or chemical parting means, for example solvents etc. By means of the configuration according to the disclosure of the power-tool parting device, a versatile tool for machining workpieces can advantageously be achieved.

Advantageously, the power-tool parting device comprises at least one torque transmission element which is mounted at least partially in the guide unit. Preferably, the torque transmission element has a concentric cutout into which a pinion of a drive unit of a portable power tool and/or a gear wheel and/or a toothed shaft of a transmission unit of the portable power tool can engage in a mounted state. The cutout is formed in this case preferably by a hexagonal socket. However, it is also conceivable for the cutout to have some other configuration that appears appropriate to a person skilled in the art. By means of the configuration according to the disclosure of the power-tool parting device, a closed system can be achieved in a structurally simple manner, said closed system being easily mountable by an operator on a power tool provided for the purpose. It is thus possible advantageously to avoid the individual mounting of components, for example the cutting strand, the guide unit and the torque transmission element, by the operator in order to use the power-tool parting device according to the disclosure.

It is furthermore proposed that the cutting strand segment is formed in a manner furnished with particles at least in a region of a cutting element of the cutting strand segment. In this case, a cutting tip of the cutting element is preferably furnished with particles. However, it is also conceivable for the entire cutting element to be furnished with particles.

Advantageously, a property of the cutting element of the cutting strand segment can be adapted to different use requirements.

Advantageously, the cutting element is formed in a manner furnished with particles of diamonds and/or of a ceramic material. However, it is also conceivable for the cutting element alternatively or additionally to be furnished with particles of a metal, in particular hard-metal, material or of some other material that appears appropriate to a person skilled in the art. Thus, by means of furnishing with particles, a hard, non-defined cutting edge of the cutting element can advantageously be realized.

In addition, the disclosure proceeds from a portable power tool having at least one coupling device which is couplable in a form-fitting and/or force-fitting manner to a power-tool parting device according to the disclosure. A "portable power tool" should be understood here as meaning in particular a power tool, in particular a handheld power tool, which can be transported by an operator without the use of a transport machine. The portable power tool has in particular a mass which is less than 40 kg, preferably less than 10 kg and particularly preferably less than 5 kg. A portable power tool which is suitable in a particularly advantageous manner for a broad use spectrum can advantageously be achieved.

In this case, the power-tool parting device according to the disclosure and/or the portable power tool according to the disclosure is not intended to be limited to the above-described application and embodiment. In particular, the power-tool parting device according to the disclosure and/or the portable power tool according to the disclosure can have a number of individual elements, components and units which differs from the number mentioned herein in order to fulfill a functionality described herein.

BRIEF DESCRIPTION OF THE DRAWINGS

Further advantages can be gathered from the following description of the drawings. Exemplary embodiments of the disclosure are illustrated in the drawing. The drawing, the description and the claims contain numerous features in combination. A person skilled in the art will expediently also consider the features individually and combine them to form appropriate further combinations.

In the drawing.

DETAILED DESCRIPTION

Figure 1:
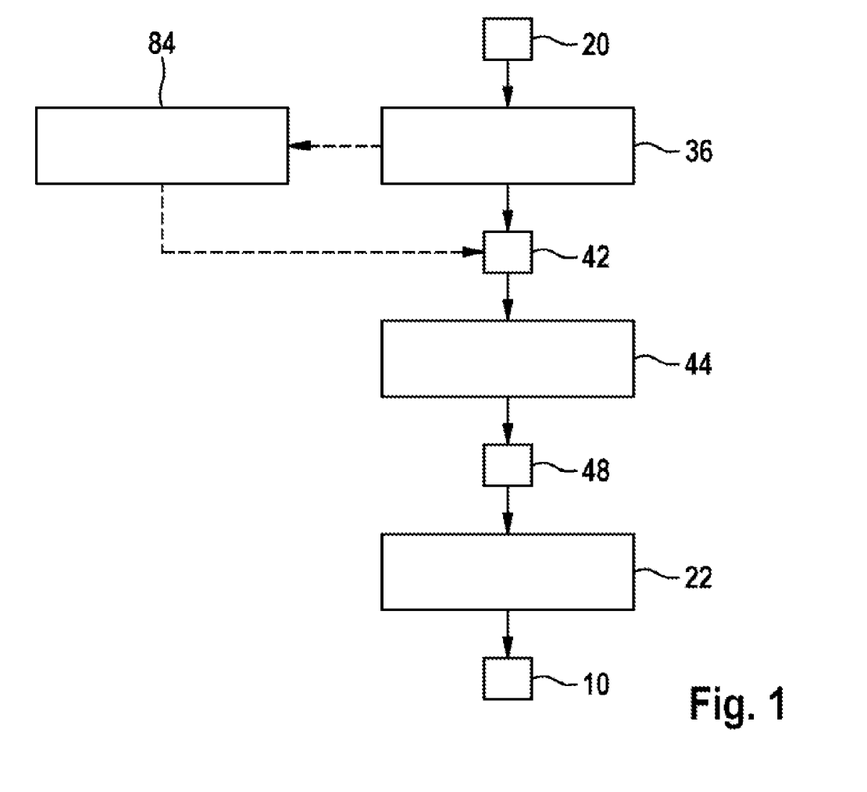
FIG. 1 shows a schematic illustration of a diagram of a sequence of a method according to the disclosure for producing at least one cutting strand segment of a cutting strand.

FIG. 1 shows a schematic sequence of a method for producing at least one cutting strand segment 10 of a cutting strand 12 (reference signs in FIGS. 4a to 9 provided with letters a to c), said cutting strand segment 10 comprising at least one cutting element 14 (reference signs in FIGS. 4a to 9 provided with letters a to c) and a cutter carrier element 16 (reference signs in FIGS. 4a to 9 provided with letters a to c) which has at least one connecting element 18 (reference signs in FIGS. 4a to 9 provided with letters a to c). In a first step, the cutting strand segment 10 is punched from a band material 20. However, it is also conceivable for the cutting strand segment 10 to be lasered out of the band material 20, be cut out by means of a water jet or be cut out by means of a removal and forming method, for example by erosion, milling etc. In this case, a bimetal is used as the band material 20. In an alternative embodiment of the method, a hard metal is used as the band material 20. However, it is also conceivable for some other material that appears appropriate to a person skilled in the art and is suitable for a punching operation to be used as the band material 20. The band material 20 is fed to a punching device 36 in a manner already known to a person skilled in the art by means of a rolling device (not illustrated in more detail here).

By means of the punching device 36, the cutting strand segment 10 is punched out of the band material 20. In this way, the cutting element 14 and the cutter carrier element 16 are punched out of the band material 20 during one method step. In this case, the connecting element 18 is likewise already integrally formed on the cutter carrier element 16 during punching by means of forming by interaction of a die and a punch of the punching device 36. In addition, by means of the interaction of the die and the punch, a connecting cutout 38 (reference signs in FIGS. 4a to 9 provided with letters a to c) of the cutting strand segment 10 is integrally formed on the cutter carrier element 16 or embossed into the cutter carrier element 16. However, it is also conceivable for the connecting element 38 to be embossed into the cutter carrier element 16 after the punching operation by means of a connecting element embossing device (not illustrated in more detail here). Furthermore, by means of the interaction of the die and the punch, a segment guide element 40 (reference signs in FIGS. 4a to 9 provided with letters a to c) of the cutting strand segment 10 is integrally formed on the cutter carrier element 16. However, it is also conceivable for further functional elements, for example a transverse securing region, a transverse securing element etc., to additionally be integrally formed on the cutting strand segment 10 by means of the interaction of the die and the punch. In this way, at least in one further step, a transverse securing element 24 is embossed at least onto the cutter carrier element 16. This step can already take place at this stage of the method. However, it is also conceivable for the transverse securing element 24 to take place only after mounting of the cutting strand segment 10 in order to form the cutting strand 12 by means of a further embossing device (not illustrated in more detail here).

In addition, in a further, additional or alternative step of the method, a cutting edge reinforcing element configured as a hard-metal cutting edge in the form of a strip, or a cutting edge reinforcing element configured as a strip made of some other highly wear-resistant material that appears appropriate to a person skilled in the art is attached to the cutting element 14 of the cutting strand segment 10 by a welding device 84 by means of a welding method. In this case, a weld seam 86 (reference signs in FIGS. 4b and 4c provided with the letter a) which is intended for the attachment of the cutting edge reinforcing element to the cutting element 14 has a maximum spacing 88 (reference signs in FIGS. 4b and 4c provided with the letter a) of less than 0.4 mm (FIG. 4b) relative to a cutting edge of the cutting element 14 or relative to a tooth tip of the cutting element 14. In this way, the cutting edge reinforcing element, viewed in a direction extending at least substantially parallel to a cutting plane of the cutting element 14 or of the cutting strand 12 and at least substantially perpendicularly to a cutting direction 56 (reference signs in FIGS. 4b and 4c provided with the letter a) of the cutting element 14 or of the cutting strand 12, has a maximum extent which, in a state welded to the cutting element 14, corresponds at most to the maximum spacing 88 of the weld seam 86 relative to the cutting edge of the cutting element 14 or relative to the tooth tip of the cutting element 14. Furthermore, the weld seam 86, viewed in a direction toward the cutter carrier element 16 starting from the cutting edge or the tooth tip, has a maximum spacing 90 (reference signs in FIGS. 4b and 4c provided with the letter a) of less than 0.3 mm from a closest embossed contour 94 (reference signs in FIGS. 4b and 4c provided with the letter a) of the cutting strand segment 10. In addition, the weld seam 86, viewed in a direction extending at least substantially parallel to the cutting plane of the cutting element 14 or of the cutting strand 12 and at least substantially perpendicularly to the cutting direction 56 of the cutting element 14 or of the cutting strand 12, has a maximum extent 92 (reference signs in FIG. 4c provided with the letter a) of less than 460 μm (FIG. 4c).

In a further step, the cutting strand segment 10 is subjected to an embossing operation. In this case, the cutting strand segment 10 is fed in the form of a punched blank 42 to an embossing device 44. By means of the embossing device 44, a set of the cutting element 14 relative to an outer surface 46 (reference signs in FIGS. 4a to 9 provided with letters a to c) of the cutter carrier element 16 is achieved. In this case, material in the region of the cutting element 14 is displaced by the embossing device 44 relative to the outer surface 46. However, it is also conceivable for the cutting strand segment 10 to be fed to the embossing device 44 only at a later time in the method in order to set the cutting element 14 relative to the outer surface 46.

Furthermore, in a further step, the cutting strand segment 10 is fed to a finishing device 22 in order to feed the cutting strand segment 10 to a finishing process. In this case, the cutting strand segment 10 is fed as an embossed blank 48 to the finishing device 22. In the finishing device 22, a coating is applied to the cutting strand segment 10 at least in a subregion of the cutting strand segment 10. The subregion of the cutting strand segment 10 is formed by the cutting element 14. In this case, the cutting strand segment 10 having the cutting element 14 is guided through an immersion bath unit (not illustrated in more detail here) of the finishing device 22. In the immersion bath unit, the cutting element 14 is coated at least partially with a solder. However, it is also conceivable for the cutting element 14 to be coated with a solder by means of an application unit of the finishing device 22. In a further step, in the finishing device 22, that subregion of the cutting strand segment 10 that is provided with the coating is furnished with particles. In this case, the particles are furnished with particles either by means of passing through a further immersion bath or by means of particles being pressed onto that subregion of the cutting strand segment 10 that is provided with the coating. The particles are in the form of diamond particles, hardmetal particles or ceramic particles. However, it is also conceivable, as an alternative to the immersion bath, for the cutting strand segment 10 to be coated, at least in a subregion, by means of a chemical vapor deposition unit (not illustrated in more detail here) of the finishing device 22. Other methods that appear appropriate to a person skilled in the art for coating the cutting element 14 of the cutting strand segment 10 by means of the finishing device 22 are likewise conceivable, for example by means of a physical vapor deposition method (PVD method) or by means of a plasma assisted chemical vapor deposition method (PACVD method) etc. After a finishing operation by means of the finishing device 22, the cutting strand segment 10 is in the form of a finished part which is connected to further cutting strand segments (not illustrated in more detail here) in a further working process in order to form the cutting strand 12. In this case, the individual cutting strand segments are fed to a mounting device in which the individual cutting strand segments are connected together. It is conceivable for transverse securing elements to be integrally formed on the cutting strand segments by means of the further embossing device (not illustrated in more detail here) following mounting, said transverse securing elements being intended to largely prevent a transverse movement of the individual cutting strand segments in a direction extending at least substantially perpendicularly to a cutting plane of the cutting strand 12.

FIGS. 2 to 9 illustrate various exemplary embodiments of cutting strand segments which are produced by means of the above-described method. In this case, in order to distinguish between the exemplary embodiments, the letters a to c have been added to the reference signs of the exemplary embodiments. The following description of the exemplary embodiments is limited substantially to the differences in the geometric configuration of the cutting strand segments, produced by means of the method, of the exemplary embodiments.

Figure 2:
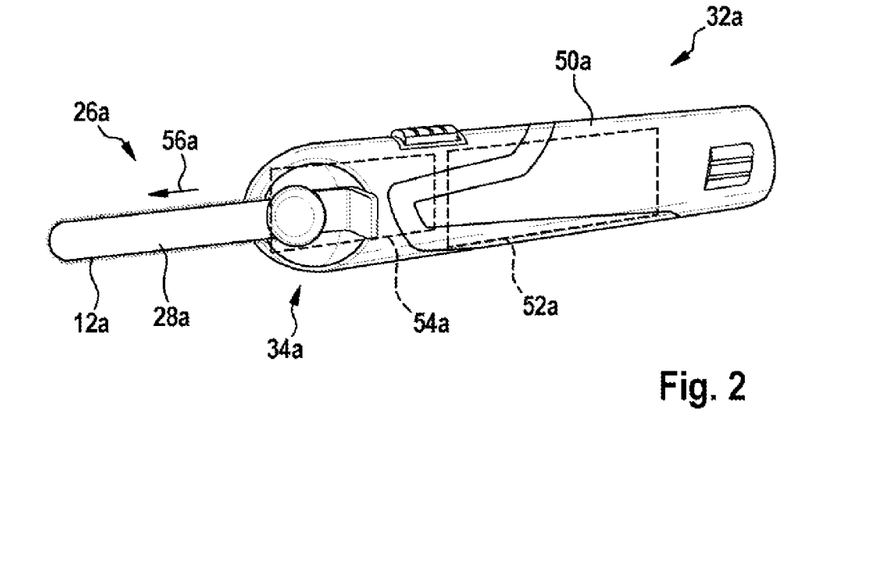
FIG. 2 shows a schematic illustration of a portable power tool according to the disclosure having a power-tool parting device according to the disclosure.

FIG. 2 shows a portable power tool 32a having a power-tool parting device 26a which together form a power-tool system. The power-tool parting device 26a comprises a cutting strand 12a, which has at least one cutting strand segment 10a (FIG. 3) produced by means of the above-described method, and a guide unit 28a for guiding the cutting strand 12a. The portable power tool 32a has a coupling device 34a for coupling in a form-fitting and/or force-fitting manner to the power-tool parting device 26a. The coupling device 34a can in this case be in the form of a bayonet closure and/or of some other coupling device that appears appropriate to a person skilled in the art. Furthermore, the portable power tool 32a has a power-tool housing 50a which encloses a drive unit 52a and a transmission unit 54a of the portable power tool 32a. The drive unit 52a and the transmission unit 54a are operatively connected together in a manner already known to a person skilled in the art in order to produce a drive moment that is transmissible to the power-tool parting device 26a. The transmission unit 54a is in the form of an angular gear. The drive unit 52a is in the form of an electric motor unit. However, it is also conceivable for the drive unit 52a and/or the transmission unit 54a to have some other configuration that appears appropriate to a person skilled in the art. The drive unit 52a is intended to drive the cutting strand 12a of the power-tool parting device 26a in at least one operating state at a cutting speed less than 6 m/s. In this case, the portable power tool 32a has at least one operating mode in which the cutting strand 12a can be driven in the guide unit 28a of the power-tool parting device 26a in a cutting direction 56a of the cutting strand 12a at a cutting speed of less than 6 m/s.

Figure 3:
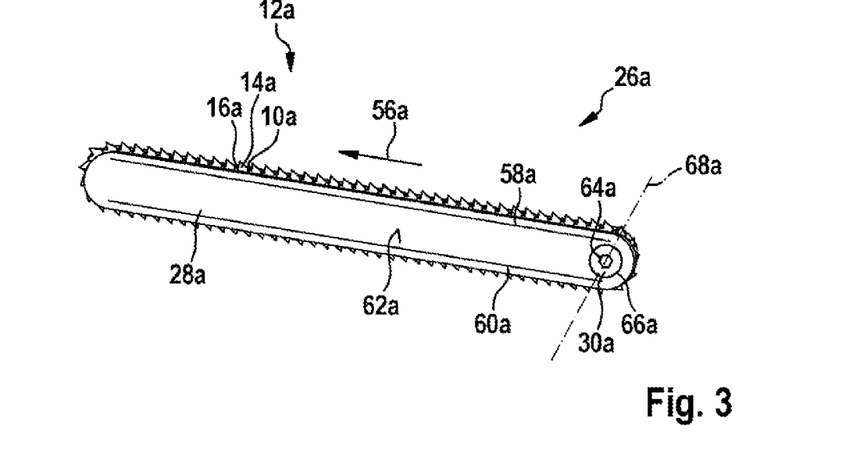
FIG. 3 shows a schematic illustration of a detail view of the power-tool parting device according to the disclosure.

FIG. 3 shows the power-tool parting device 26a in a state decoupled from the coupling device 34a of the portable power tool 32a. The power-tool parting device 26a has the cutting strand 12a and the guide unit 28a, which together form a closed system. The guide unit 28a is in the form of a sword. The cutting strand 12a is guided by means of the guide unit 28a. To this end, the guide unit 28a has at least one guide element (not illustrated in more detail here) in the form of a guide groove, by means of which the cutting strand 12a is guided. In this case, the cutting strand 12a is guided by means of peripheral regions, adjoining the guide groove, of the guide unit 28a. However, it is also conceivable for the guide element to be configured in some other manner which appears appropriate to a person skilled in the art, for example as a rib-like formation on the guide unit 28a, said rib-like formation engaging in a cutout on the cutting strand 12a. During operation, the cutting strand 12a is moved relative to the guide unit 28a in circulation around the circumference in the guide groove. The cutting strand 12a comprises overall a multiplicity of connected-together cutting strand segments 10a.

Furthermore, the guide unit 28a has at least two segment counter-guide elements 58a, 60a for guiding the cutting strand 12a. The segment counter-guide elements 58a, 60a are intended to limit a movement of the cutting strand 12a, when viewed in a direction away from the guide unit 28a, in a direction extending at least substantially parallel to the cutting plane of the cutting strand 12a. The segment counter-guide elements 58a, 60a are in this case configured as punched-out sections which extend from an outer surface 62a of the guide unit 28a in the direction of an inner surface (not illustrated in more detail here) of the guide unit 28a. In this case, the segment counter-guide elements 58a, 60a interact, in a state arranged in the guide unit 28a, with a segment guide element 40a (FIG. 4a) of the cutting strand segment 10a.

In order to drive the cutting strand 12a, the power-tool parting device 26a has a torque transmission element 30a which is connectable to the drive unit 52a and/or the transmission unit 54a in order to transmit forces and/or torques to the cutting strand 12a. To this end, the torque transmission element 30a has a coupling cutout 64a into which a pinion (not illustrated in more detail here) of the drive unit 52a and/or a gear wheel (not illustrated in more detail here) and/or a toothed shaft (not illustrated in more detail here) of the transmission unit 54a engages in a mounted state. The coupling cutout 64a is arranged concentrically in the torque transmission element 30a. Furthermore, the torque transmission element 30a is in the form of a gear wheel. The torque transmission element 30a is mounted at least partially in the guide unit 28a. In this case, the torque transmission element 30a is arranged, as seen in a direction perpendicular to the cutting plane, at least partially between outer surfaces 62a of the guide unit 28a in a cutout 66a in the guide unit 28a. Furthermore, the torque transmission element 30a is mounted in the guide unit 28a in a rotatable manner about a rotation axis 68a.

Figure 4A:
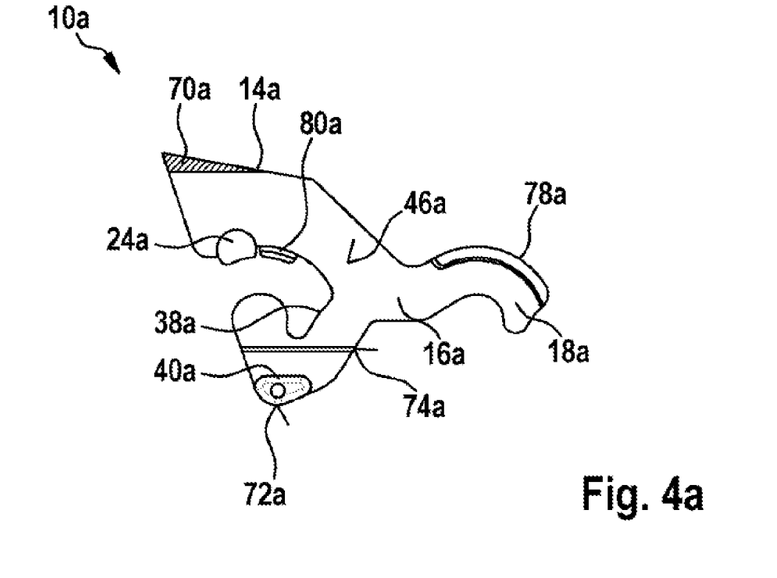
FIG. 4a shows a schematic illustration of a detail view of a cutting strand segment of a cutting strand of the power-tool parting device according to the disclosure.
Figure 4B:
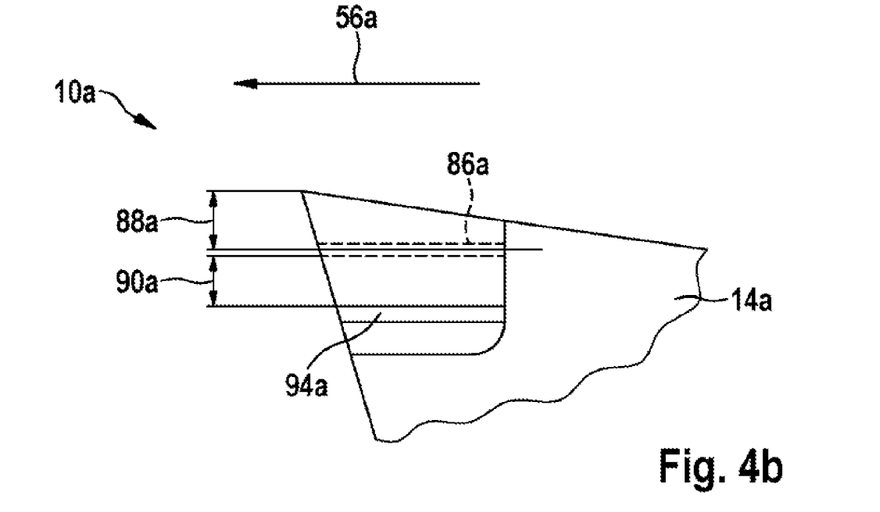
FIG. 4b shows a schematic illustration of a detail view of an arrangement of a weld seam on the cutting strand segment for attaching a resistant cutting edge to a cutting element of the cutting strand segment.
Figure 4C:
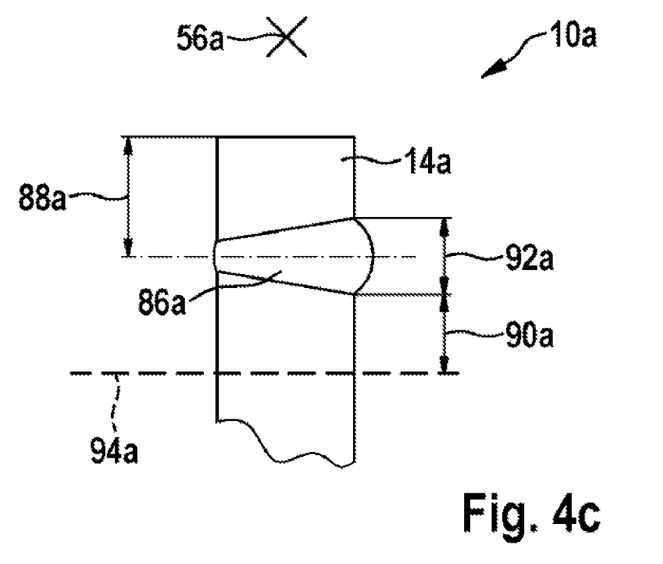
FIG. 4c shows a schematic illustration of a further detail view of the arrangement of the weld seam on the cutting strand segment.

FIG. 4a shows a detail view of the cutting strand segment 10a of the cutting strand 12a of the power-tool parting device 26a. The cutting strand segment 10a comprises at least the cutter carrier element 16a and at least the cutting element 14a. The cutter carrier element 16a and the cutting element 14a are formed integrally. The cutting element 14a has in this case a cutting layer 70a having at least titanium carbide. The cutting layer 70a is applied to the cutting element 14a by means of a CVD method. However, it is also conceivable for the cutting layer 70a alternatively or additionally to comprise a different material, for example titanium nitride, titanium carbonitride, aluminum oxide, titanium aluminum nitride, chromium nitride or zirconium carbonitride. In addition, it is also conceivable for the cutting layer 70a to be applied by means of some other method that appears appropriate to a person skilled in the art, for example by means of a PVD or PACVD method.

The cutter carrier element 16a has at least one segment guide element 40a which is intended to limit a movement of the cutter carrier element 16a, as seen in a state arranged in the guide unit 28a in a direction away from the guide unit 28a, at least in the direction extending at least substantially parallel to the cutting plane of the cutting strand 12a. The segment guide element 40a is formed by a transverse extension which extends at least substantially perpendicularly to the cutting plane of the cutting strand 12a. In this case, the segment guide element 40a delimits a longitudinal groove. For the purpose of limiting movement, the segment guide element 40a is intended to interact with the segment counter-guide elements 58a, 60a that are arranged on the inner wall, facing the cutter carrier element 16a, of the guide unit 28a and are in the form of a rib or punched-out section. The segment counter-guide elements 58a, 60a are formed in a manner corresponding to the segment guide element 40a.

Figure 7:
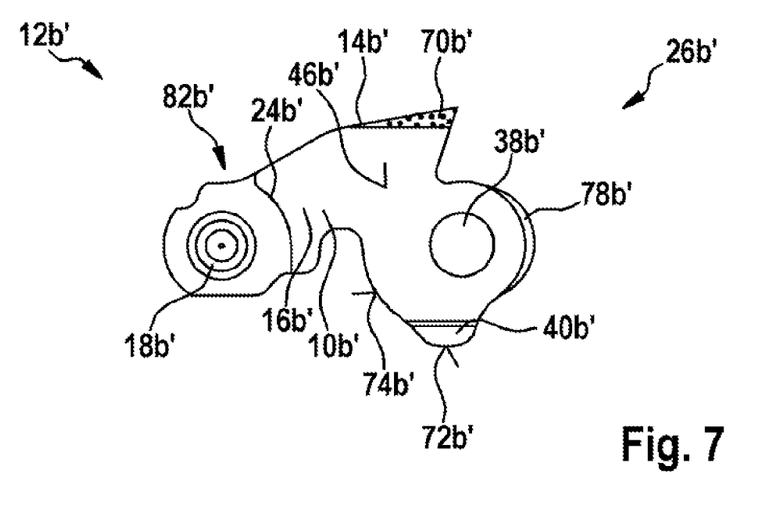
FIG. 7 shows a schematic illustration of a detail view of an alternative cutting strand segment of the cutting strand from FIG. 6.
Figure 8:
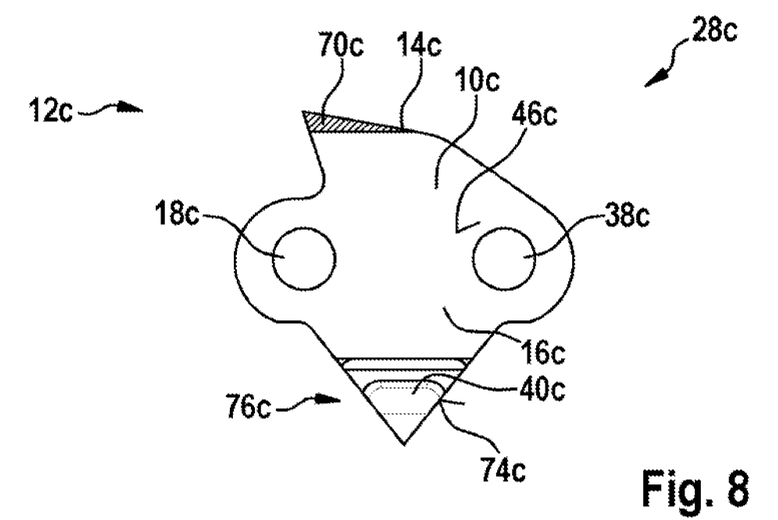
FIG. 8 shows a schematic illustration of a detail view of a cutting strand segment of a cutting strand of a further, alternative power-tool parting device according to the disclosure.

In addition, the cutter carrier element 16a has a compressive-force transmission surface 72a (FIGS. 7 and 8). The compressive-force transmission surface 72a is intended to support compressive forces which act on the cutting strand 12a when a workpiece (not illustrated in more detail here) is machined, by means of interaction with a compressive-force absorbing region (not illustrated in more detail here) of the guide unit 28a. The compressive-force absorbing region of the guide unit 28a is in this case arranged, as seen in a direction extending at least substantially perpendicularly to the cutting plane of the cutting strand 12a, between the outer surfaces 62a of the guide unit 28a, said outer surfaces 62a extending at least substantially parallel to one another.

The cutter carrier element 16a furthermore has a drive surface 74a which is intended to interact with drive surfaces of the torque transmission element 30a in order to drive the cutting strand 12a. The drive surfaces of the torque transmission element 30a are in this case in the form of tooth flanks. The drive surface 74a of the cutter carrier element 16a is in this case formed in a manner corresponding to the drive surfaces of the torque transmission element 30a. When the cutting strand 12a is driven, the tooth flanks of the torque transmission element 30a bear temporarily against the drive surface 74a in order to transmit drive forces.

In order to form the cutting strand 12a, the cutter carrier element 16a comprises at least the connecting element 18a which terminates at least substantially flush with at least one outer surface 46a of the cutter carrier element 16a. In this case, the connecting element 18a terminates, as seen along a transverse axis of the connecting element 18a, flush with the two outer surfaces 46a of the cutter carrier element 16a (only one outer surface illustrated in FIG. 4a). The transverse axis of the connecting element 18a extends at least substantially perpendicularly to the cutting plane of the cutting strand 12a. The connecting element 18a is formed integrally with the cutter carrier element 16a. In this case, the connecting element 18a is in the form of a longitudinal extension of the cutter carrier element 16a. The connecting element 18a in the form of a longitudinal extension extends at least substantially along a longitudinal extent of the cutter carrier element 16a. Thus, the connecting element 18a in the form of a longitudinal extension extends at least substantially parallel to the cutting plane of the cutting strand 12a. In this case, the longitudinal extension is formed in a hook-like manner. In this case, the longitudinal extension is formed in a manner deviating from a rod-like extension on which a circular form-fitting element is integrally formed and/or in a manner deviating from a semicircular extension. Each cutter carrier element 16a of the cutting strand segments 10a of the cutting strand 12a has in each case a connecting element 18a in the form of a longitudinal extension and in each case a connecting cutout 38a formed in a manner corresponding to the connecting element 18a. In order to form the cutting strand 12a in the form of a cutting chain, the individual connecting elements 18a of the cutter carrier elements 16a are intended in each case to realize a form-fitting connection between the cutter carrier elements 16a by means of interaction with a connecting cutout 38a, the cutter carrier elements 16a being connected pivotably together by means of said form-fitting connection.

Furthermore, the connecting element 18a in the form of a longitudinal extension has a transverse securing region 78a on one side. The transverse securing region 78a is intended to at least largely prevent a transverse movement of the cutter carrier element 16a in at least two oppositely directed directions in a coupled state relative to the further cutter carrier element, by means of interaction with at least one transverse securing element of a further cutter carrier element (not illustrated in more detail here), connected to the cutter carrier element 16a, of the cutting strand segments 10a of the cutting strand 12a. In this case, the transverse securing region 78a is in the form of a rib. However, it is also conceivable for the transverse securing region 78a to have some other configuration that appears appropriate to a person skilled in the art, for example a configuration as a groove etc. The transverse securing region 78a is arranged on a side, facing the cutting element 14a formed integrally with the cutter carrier element 16a, of the connecting element 18a.

Furthermore, the cutter carrier element 16a has two transverse securing elements 24a, 80a which are intended to interact, in the state of the cutter carrier element 16a in which it is coupled to the further cutter carrier element, with a transverse securing region of the further cutter carrier element. The transverse securing elements 24a, 80a are arranged in each case in a peripheral region, bounding the connecting cutout 38a, of the cutter carrier element 16a. In this case, the transverse securing elements 24a, 80a are formed integrally with the cutter carrier element 16a. The transverse securing elements 24a, 80a are in each case integrally formed on the cutter carrier element 16a by means of an embossing method. Thus, the transverse securing elements 24a, 80a extend, as seen in a direction extending at least substantially perpendicularly to the cutting plane of the cutting strand 12a, at most as far as the outer surfaces 46a of the cutter carrier element 16a. However, it is also conceivable for the transverse securing elements 24a, 80a to be integrally formed on the cutter carrier element 16a by means of some other method that appears appropriate to a person skilled in the art, for example by means of a welding method, by means of an adhesive-bonding method, by means of a punching method, by means of a bending method etc.

In addition, the transverse securing elements 24a, 80a are arranged, as seen in a direction extending at least substantially perpendicularly to the cutting plane of the cutting strand 12a, on sides of the cutter carrier element 16a that face away from one another. Furthermore, the transverse securing elements 24a, 80a are arranged on the cutter carrier element 16a in an offset manner relative to one another. Thus, with respect to the cutting plane of the cutting strand 12a, the transverse securing elements 24a, 80a are arranged on the cutter carrier element 16a in an arrangement differing from a mirror-symmetrical arrangement. In this case, the transverse securing elements 24a, 80a are in the form of partial extensions on a peripheral region of the connecting cutout 38a. However, it is also conceivable for the transverse securing elements 24a, 80a to have some other configuration and/or arrangement that appears appropriate to a person skilled in the art, for example a configuration as webs extending in parallel which bound a groove-shaped cutout in the peripheral region of the connecting cutout 38a, as seen in a direction extending at least substantially perpendicularly to the cutting plane of the cutting strand 12a.

FIGS. 6 to 9 illustrate alternative exemplary embodiments. Substantially identical components, features and functions are designated in principle with the same reference signs. The following description is limited substantially to the differences with respect to the first exemplary embodiment described in FIGS. 2 to 5, it being possible to refer to the description of the first exemplary embodiment in FIGS. 2 to 5 with regard to identical components, features and functions.

Figure 5:
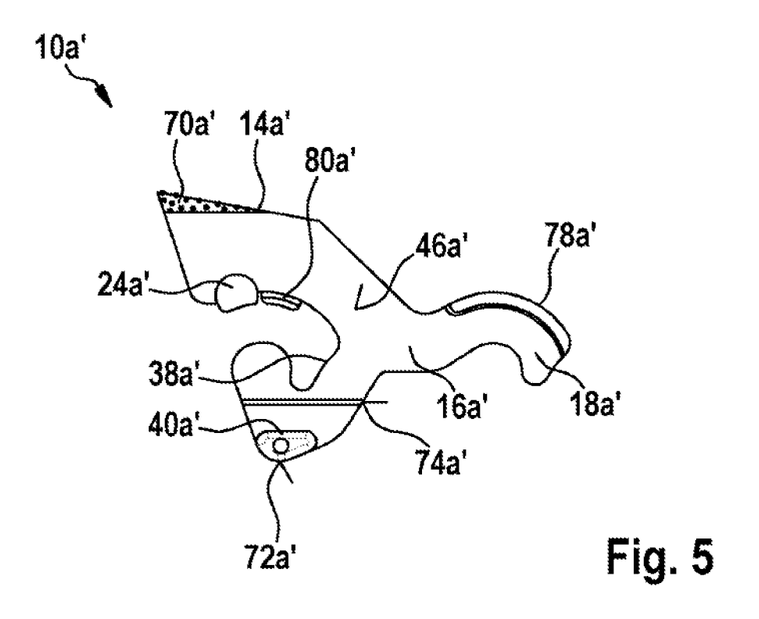
FIG. 5 shows a schematic illustration of a detail view of an alternative cutting strand segment of the cutting strand from FIG. 4.

FIG. 5 shows a cutting strand segment 10a' formed in an alternative manner to the cutting strand segment 10a illustrated in FIG. 4. The cutting strand segment 10a' is formed at least substantially analogously to the cutting strand segment 10a illustrated in FIG. 4. In contrast to the cutting strand segment 10a from FIG. 4, the cutting strand segment 10a' from FIG. 5 has a cutting element 14a' furnished with particles. In this case, the cutting element 14a' has a coating into which particles have been introduced. The particles are in this case in the form of diamond particles. However, it is also conceivable for the particles to have some other configuration that appears appropriate to a person skilled in the art, for example a configuration as hard-metal particles, as ceramic particles etc.

Figure 6:
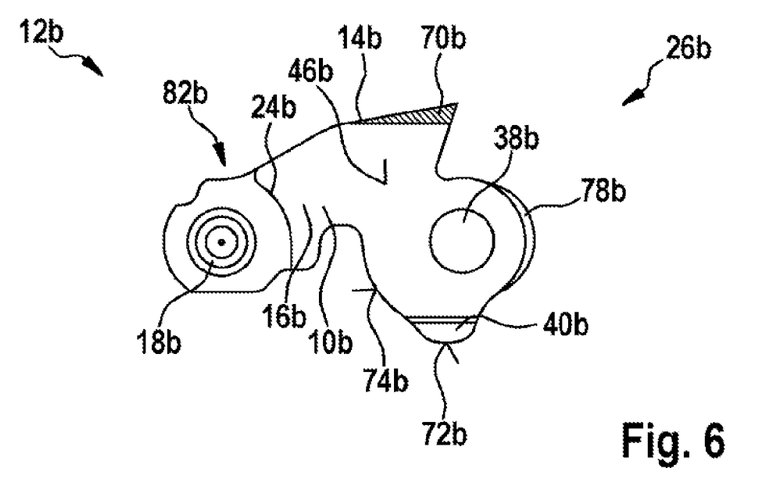
FIG. 6 shows a schematic illustration of a detail view of a cutting strand segment of a cutting strand of an alternative power-tool parting device according to the disclosure.

FIG. 6 shows a further, alternative cutting strand segment 10b of a cutting strand 12b of a power-tool parting device 26b. The cutting strand segment 10b comprises at least one cutter carrier element 16b and at least one cutting element 14b. The cutter carrier element 16b and the cutting element 14b are formed integrally. The cutting element 14b has in this case a cutting layer 70b having at least titanium carbide. In order to form the cutting strand 12b, the cutter carrier element 16b comprises at least one connecting element 18b which terminates at least substantially flush with at least one outer surface 46b of the cutter carrier element 16b. The connecting element 18b is formed in a pin-like manner. In this case, the connecting element 18b extends in a direction extending at least substantially perpendicularly to a cutting plane of the cutting strand 12b. Furthermore, the cutter carrier element 16b has a connecting cutout 38b. In order to form the cutting strand 12b in the form of a cutting chain, the connecting cutout 38b is intended to realize, by means of interaction with a connecting element of a further cutter carrier element of a further cutting strand segment (not illustrated in more detail here) of the cutting strand 12b, a form-fitting connection between the cutter carrier element 16b and the further cutter carrier element, the cutter carrier element 16b and the further cutter carrier element being connected pivotably together by means of said form-fitting connection.

Furthermore, the cutter carrier element 16b has at least one transverse securing element 24b which is intended to at least largely prevent a transverse movement of the cutter carrier element 16b in a coupled state relative to the further cutter carrier element. In addition, the cutter carrier element 16b has a transverse securing region 78b. The transverse securing element 24b is in the form of an extension. In this case, the transverse securing element 24b is arranged in a coupling region 82b of the cutter carrier element 16b. Thus, the transverse securing element 24b bounds, together with the coupling region 82b, a groove-like cutout, extending at least substantially parallel to the cutting plane of the cutting strand 12b, in order to receive a transverse securing region (not illustrated in more detail here) of the further cutter carrier element in a coupled state. Arranged in the coupling region 82b is the connecting element 18b, which is introduced into a connecting cutout of the further cutter carrier element in order to realize a form-fitting connection when the cutting strand 12b is mounted. The transverse securing element 24b is formed integrally with the cutter carrier element 16b. In this case, the transverse securing element 24b is integrally formed on the cutter carrier element 16b by means of an embossing method.

The transverse securing region 78b is arranged, as seen in a cutting direction of the cutting strand 12b, on a side of the cutter carrier element 16b that faces away from the coupling region 82b. In this case, the transverse securing region 78b is in the form of a rib-like longitudinal extension. However, it is also conceivable for the transverse securing region 78b to have some other configuration that appears appropriate to a person skilled in the art, for example a configuration as a groove etc. The transverse securing element 24b covers the transverse securing region of the further cutter carrier element in a coupled state in order to at least largely prevent a transverse movement of the cutter carrier element 16b relative to the further cutter carrier element in at least two directions oriented in opposite directions. In addition, the cutter carrier element 16b comprises at least one segment guide element 40b. Furthermore, the cutter carrier element 16b has a compressive-force transmission surface 72b.

FIG. 7 shows a cutting strand segment 10b' formed in an alternative manner to the cutting strand segment 10b illustrated in FIG. 6. The cutting strand segment 10b' is formed at least substantially analogously to the cutting strand segment 10b illustrated in FIG. 6. In contrast to the cutting strand segment 10b from FIG. 6, the cutting strand segment 10b' from FIG. 7 has a cutting element 14b' furnished with particles. In this case, the cutting element 14b' has a coating into which particles have been introduced. The particles are in this case in the form of diamond particles. However, it is also conceivable for the particles to have some other configuration that appears appropriate to a person skilled in the art, for example a configuration as hard-metal particles, as ceramic particles etc.

FIG. 8 shows a further, alternative cutting strand segment 10c of a cutting strand 12c of a power-tool parting device 26c. The cutting strand segment 10c comprises at least one cutter carrier element 16c and at least one cutting element 14c. The cutter carrier element 16c and the cutting element 14c are formed integrally. The cutting element 14c has in this case a cutting layer 70c having at least titanium carbide. In order to form the cutting strand 12c, the cutter carrier element 16c comprises a pin-like connecting element 18c and a connecting cutout 38c, into which a pin-like connecting element (not illustrated in more detail here) of a further cutter carrier element (not illustrated in more detail here) of the cutting strand 12c is introducible. In addition, the cutter carrier element 16c comprises at least one segment guide element 40c. Furthermore, the cutter carrier element 16c comprises a triangular drive region 76c. In this case, the segment guide element 40c is arranged in the drive region 76c. Furthermore, a drive surface 74c of the cutter carrier element 16c is arranged in the drive region 76c.

Figure 9:
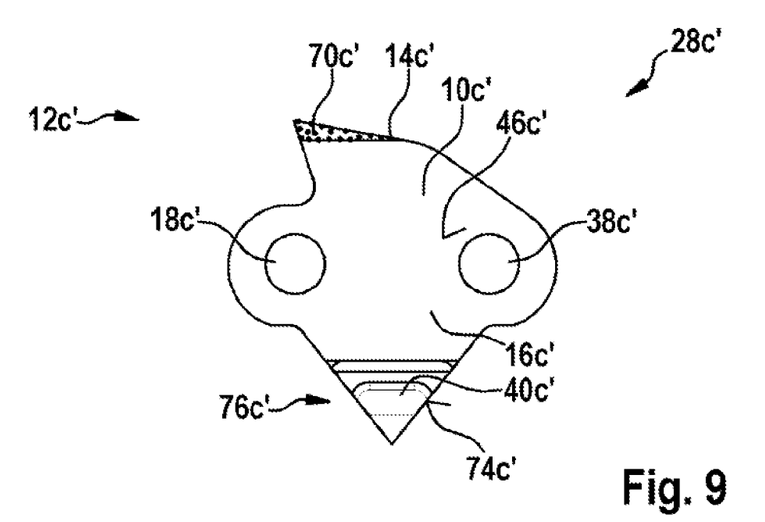
FIG. 9 shows a schematic illustration of a detail view of an alternative cutting strand segment of the cutting strand from FIG. 8.

FIG. 9 shows a cutting strand segment 10c' formed in an alternative manner to the cutting strand segment 10c illustrated in FIG. 8. The cutting strand segment 10c' is formed at least substantially analogously to the cutting strand segment 10c illustrated in FIG. 8. In contrast to the cutting strand segment 10c from FIG. 8, the cutting strand segment 10c' from FIG. 9 has a cutting element 14c' furnished with particles. In this case, the cutting element 14c' has a coating into which particles have been introduced. The particles are in this case in the form of diamond particles. However, it is also conceivable for the particles to have some other configuration that appears appropriate to a person skilled in the art, for example a configuration as hard metal particles, as ceramic particles etc.

The invention claimed is:

1. A method for producing at least one cutting strand segment of a cutting strand, the cutting strand segment including at least one cutting element and at least one cutter carrier element having at least one connecting element, the method comprising:
   punching the at least one cutting strand segment out of a band material; and
   welding a cutting edge reinforcing element to the at least one cutting element of the punched out at least one cutting strand segment,
   wherein the band material is bimetal.

2. The method as claimed in claim 1, further comprising:
   subjecting the at least one cutting strand segment to an embossing operation at least in a subregion of the at least one cutting element.

3. The method as claimed in claim 1, further comprising:
   feeding the at least one cutting strand segment to a finishing device.

4. The method as claimed in claim 3, further comprising:
   in the finishing device, applying a coating to the at least one cutting strand segment at least onto the cutting edge reinforcing element of the at least one cutting strand segment.

5. The method as claimed in claim 4, further comprising:
   in the finishing device, furnishing particles to the at least one cutting strand segment at least onto the cutting edge reinforcing element of the at least one cutting strand segment to which the coating is applied.

6. The method as claimed in claim 1, further comprising:
   embossing a transverse securing element onto the at least one cutter carrier element.

7. The method as claimed in claim 1, wherein the welding forms a weld seam between the at least one cutting element and the cutting edge reinforcing element, and a maximum spacing between the weld seam and a cutting edge of the cutting edge reinforcing element, measured perpendicularly to a cutting direction of the at least one cutting element, is less than 1 mm.

8. The method as claimed in claim 6, wherein the welding forms a weld seam between the at least one cutting element and the cutting edge reinforcing element, and a first maximum spacing between the weld seam and a cutting edge of the cutting edge reinforcing element, measured perpendicular to a cutting direction of the at least one cutting element, is less than 0.4 mm and a second maximum spacing between the weld seam and a nearest embossed contour, measured perpendicular to the cutting direction, is less than 0.8 mm.

9. The method as claimed in claim 8, wherein a maximum extent of the weld seam, measured perpendicular to the cutting direction, is less than 800 μm.

* * * * *